(12) United States Patent
McKay et al.

(10) Patent No.: US 6,875,145 B2
(45) Date of Patent: Apr. 5, 2005

(54) ROTARY ACTUATOR

(75) Inventors: Richard John McKay, Stafford (GB); Richard James Clapham, Stafford (GB)

(73) Assignee: Goodrich Actuation Systems Ltd. (GB)

( * ) Notice: Subject to any disclaimer, the term of this patent is extended or adjusted under 35 U.S.C. 154(b) by 0 days.

(21) Appl. No.: 10/289,847

(22) Filed: Nov. 7, 2002

(65) Prior Publication Data

US 2003/0100398 A1 May 29, 2003

(30) Foreign Application Priority Data

Nov. 8, 2001 (GB) .............................................. 0126891

(51) Int. Cl.⁷ ............................ F16H 1/28; F16H 37/06
(52) U.S. Cl. ........................... 475/5; 475/263; 475/338
(58) Field of Search ............................... 475/1, 5, 263, 475/338

(56) References Cited

U.S. PATENT DOCUMENTS

| | | | | |
|---|---|---|---|---|
| 4,578,993 A | * | 4/1986 | Burandt | 475/158 |
| 4,688,744 A | * | 8/1987 | Aldrich | 74/661 |
| 4,721,016 A | * | 1/1988 | Burandt | 475/342 |
| 4,742,730 A | * | 5/1988 | Dorn et al. | 475/340 |
| 4,751,855 A | * | 6/1988 | Hudson | 475/332 |
| 4,779,822 A | * | 10/1988 | Burandt et al. | 244/75 R |
| 4,856,379 A | * | 8/1989 | Jafarey | 475/176 |
| 4,932,613 A | * | 6/1990 | Tiedeman et al. | 475/334 |
| 4,932,929 A | * | 6/1990 | Capewell | 475/221 |
| 5,071,397 A |   | 12/1991 | Grimm | |
| 5,106,354 A | * | 4/1992 | Russ et al. | 475/341 |
| 5,120,285 A |   | 6/1992 | Grimm | |
| 5,199,538 A | * | 4/1993 | Fischer et al. | 188/134 |
| 5,518,466 A |   | 5/1996 | Tiedeman | |
| 5,779,587 A |   | 7/1998 | Reilly | |
| 6,419,606 B1 | * | 7/2002 | Tengan et al. | 475/263 |
| 6,443,034 B1 | * | 9/2002 | Capewell et al. | 475/15 |
| 2003/0114265 A1 | * | 6/2003 | Larson et al. | 475/249 |

FOREIGN PATENT DOCUMENTS

WO   WO 0029286   5/2000

* cited by examiner

Primary Examiner—Charles A. Marmor
Assistant Examiner—Dennis J. Abdelnour
(74) Attorney, Agent, or Firm—Trexler, Bushnell, Giangiorgi, Blackstone & Marr, Ltd.

(57) ABSTRACT

A geared rotary actuator comprising first and second reduction gear trains, an earth for fixing the actuator in use, and an output member moveable relative to said earth for connection to a component to be moved by the actuator, said first and second reduction gear trains each including a respective rotary input member and a respective output, said first and second gear train input members being arranged in use to be driven by respective sources of rotary movement and said gear trains having fixed, equal, step-down gear ratios between their input and output, and, the actuator further including output summing means interconnecting said outputs of said first and second gear reduction trains with said output member of the actuator whereby movement of said output member relative to said earth in response to rotation of said gear train input members is the sum of the movements of said gear train outputs.

16 Claims, 4 Drawing Sheets

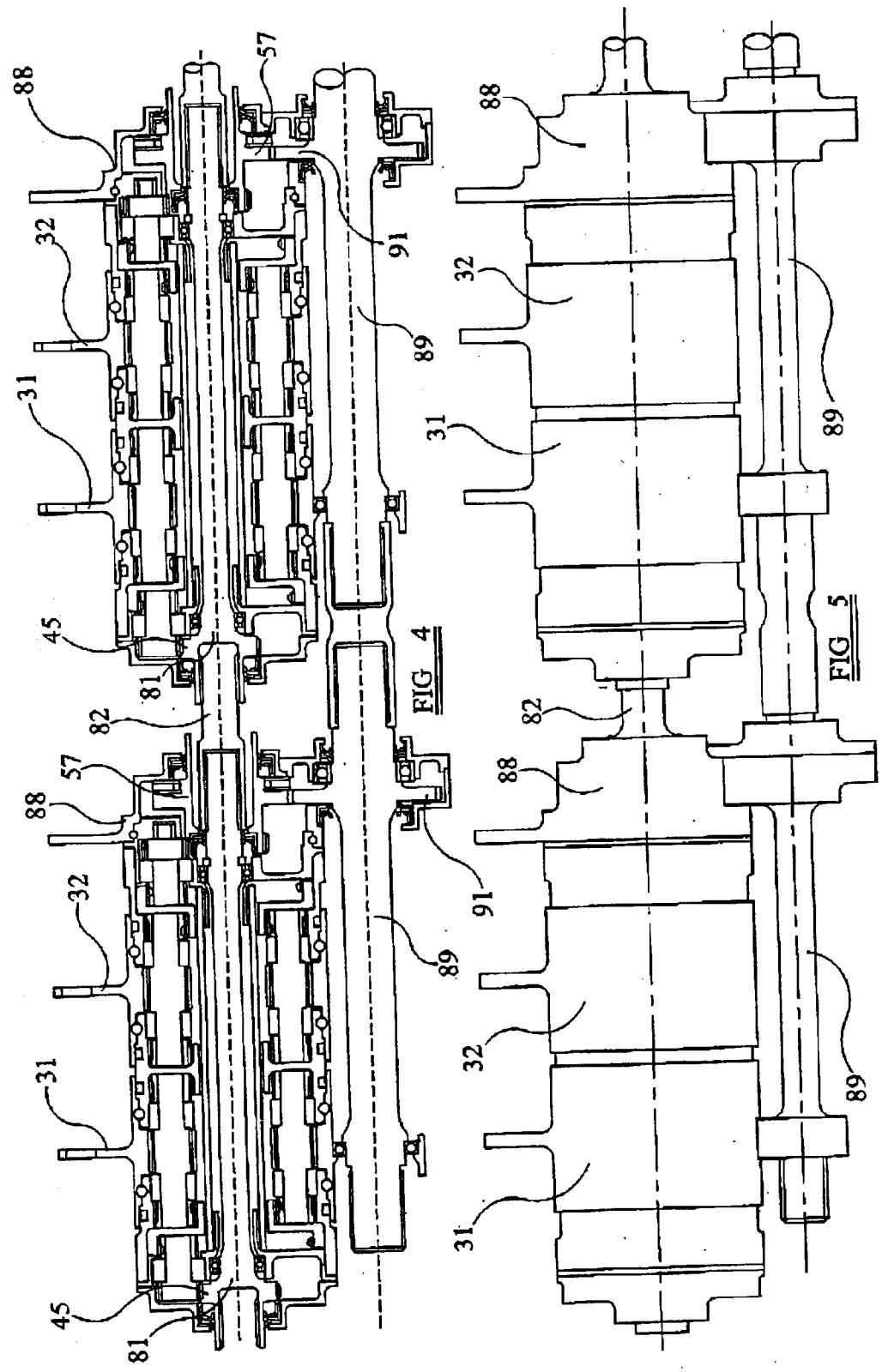

ROTARY ACTUATOR

Figure 1:
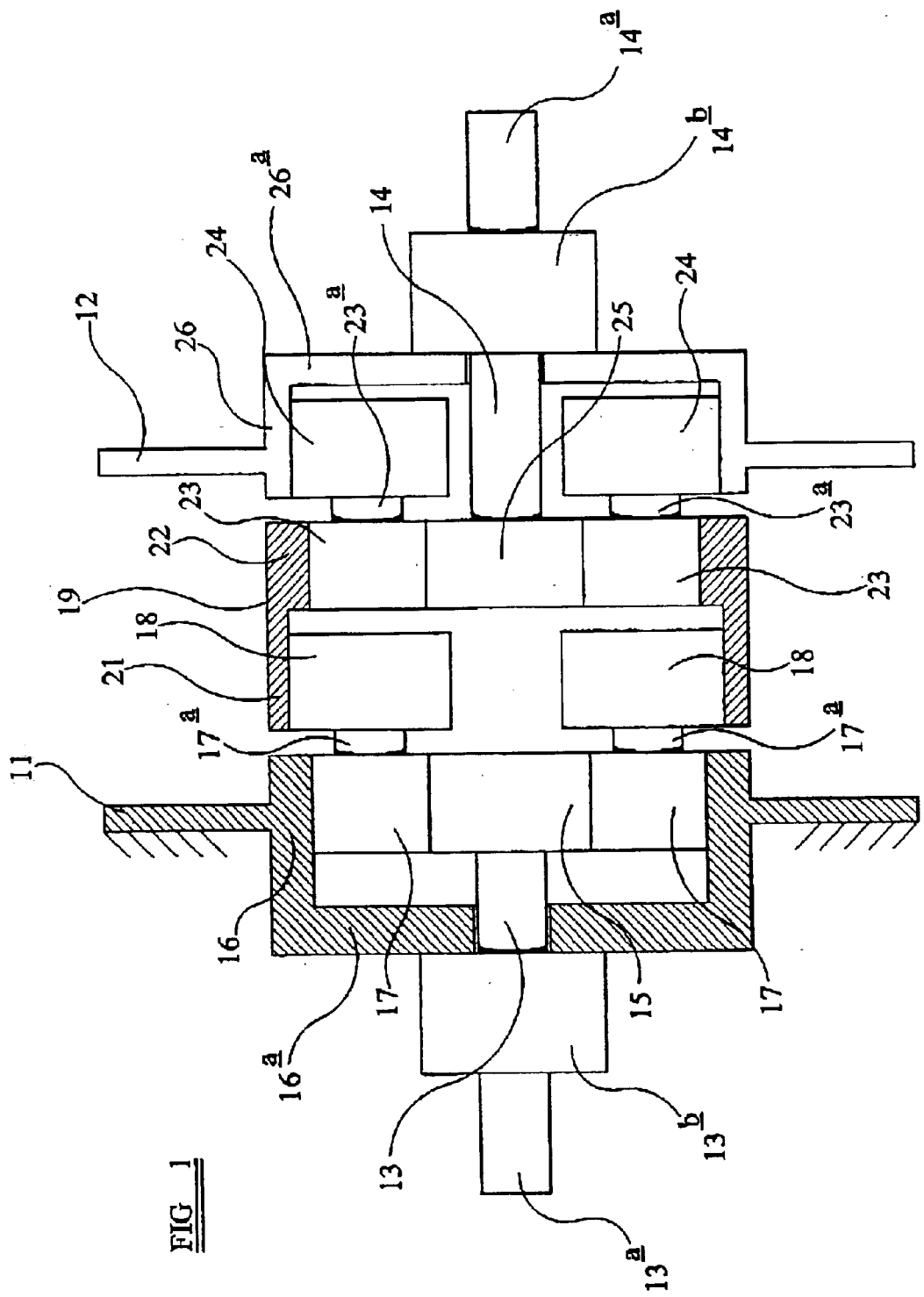

This invention relates to a geared rotary actuator.

Geared rotary actuators are used, inter alia to move, and control the position of, flight control surfaces of aircraft. Such actuators are intended to step down high speed rotation of hydraulic or electric drive motors to provide a slow speed accurate control of the position of a flight control surface, and it is known for such actuators to lie along the "hinge-line" of the flight control surface in question. Although it is blown for a flight control surface to have a single actuator associated with it it is more usual for there to be two or more actuators driven in unison and actuating the same surface and a recognised concern is that although such actuators are not prone to failure, there can be a failure mode in which an actuator will jam and in so doing will lock the flight control surface against movement by the remaining actuator or actuators.

U.S. Pat. Nos. 5,518,466 and 5,779,587 show attempts to overcome this difficulty by incorporating frangible shear mechanisms which break in the event of an actuator becoming jammed to ensure that the failed actuator does not lock the flight control surface. U.S. Pat. No. 5,071,397 shows a similar approach in which a ball-ramp mechanism is used to disconnect a jammed component for the same purpose.

U.S. Pat. No. 5,120,285 discloses a solution in which the need for a shear or disconnect action is removed. In U.S. Pat. No. 5,120,285 the actuator has a single input and a single output, but between the input and the output there are two alternative drive paths either of which may become jammed leaving the other path operative However, an objective of the arrangement illustrated in U.S. Pat. No. 5,120,285 is that the gear ratio between the input and the output should not change irrespective of the drive paths in use, and thus it is essential that both drive paths are made sufficiently strong to carry the whole of the operating power even though in normal operation power transmission through the actuator will be shared between them, resulting in an actuator which is far heavier than would otherwise be desirable. An additional disadvantage of such an arrangement is that it is not possible in practice to determine which path between the input and the output is being used to drive the control surface at any given instant. As a result there is no valid assumption which can be made, or wear/fatigue calculation which can be performed, which accurately represents the way in which power transmission in the paths through the actuator is shared. Indeed, there may be a normal operating mode in which power transmission is not shared and the only safe assumption regarding wear of the gear components which can be made is that each path is providing full power transmission at all times, and service requirements based upon such an assumption are of course more onerous than may actually be necessary. Furthermore, it is not possible in the arrangement described in U.S. Pat. No. 5,120,285 to determine when a jam has occurred since the external operation of the actuator appears identical irrespective of whether one, the other, or both drive paths are operative.

International patent application WO00/29286 shows an arrangement extremely similar to that described in U.S. Pat. No. 5,120,285. The disclosure in WO00/29286 requires the presence of a differential gear mechanism between the drive trains and the single prime mover, and suffers from all of the disadvantages described above in relation to the disclosure in U.S. Pat. No. 5,120,285.

It is an object of the present invention to provide a geared rotary actuator in which the aforementioned disadvantages are obviated.

In accordance with the present invention there is provided a geared rotary actuator comprising first and second reduction gear trains, an earth for fixing the actuator in use, and an output member moveable relative to said earth for connection to a component to be moved by the actuator, said first and second reduction gear trains each including a respective rotary input member and a respective output, said first and second gear train input members being arranged in use to be driven by respective sources of rotary movement, and, the actuator further including output summing means interconnecting said outputs of said first and second gear reduction trains with said output member of the actuator whereby movement of said output member relative to said earth in response to rotation of said gear train input members is the sum of the movements of said gear train outputs.

Preferably said gear trains have fixed, equal, stepdown gear ratios between their input and output.

The invention also resides in an actuator system including a geared rotary actuator as defined above, torque sensitive means for determining when the torque at the first and second gear train input members exceeds a predetermined value for deactivating the application of torque to that one of said first and second gear train input members whose torque has exceeded said predetermined value.

The invention further resides in an actuator system including first and second geared rotary actuators each as defined above, the first gear train input members of the first and second actuators being driven from a common first source of rotary movement and the second gear train input members of the first and second actuators being driven from a common second source of rotary movement.

Conveniently said torque sensitive means deactivates the application of torque to that one of said first and second gear train input members whose torque has exceeded said value, by disconnecting the relevant input member from its source of rotary movement.

Preferably said torque sensitive means also effects application of braking load to the disconnected input member.

Alternatively said torque sensitive means for deactivating the application of torque to that one of said first and second gear train input members whose torque has exceeded said value, serves to render the source of rotary movement of the relevant input member free running.

Desirably there is provided a second geared rotary actuator, the first gear train input members of the first and second actuators being driven from a common first source of rotary movement and the second gear train input members of the first and second actuators being driven from a common second source of rotary movement.

Preferably said first and second rotary geared actuators are aligned with their longitudinal axes coextensive.

Preferably said first gear train input members are driven from said common first source of rotary movement by means including a shaft which extends coaxially through said first geared rotary actuator.

Desirably said second gear train input members are driven from said common second source of rotary movement by means including a shaft which extends externally of the gear trains of said first geared rotary actuator, parallel to the longitudinal axis of the first geared rotary actuator.

Figure 2:
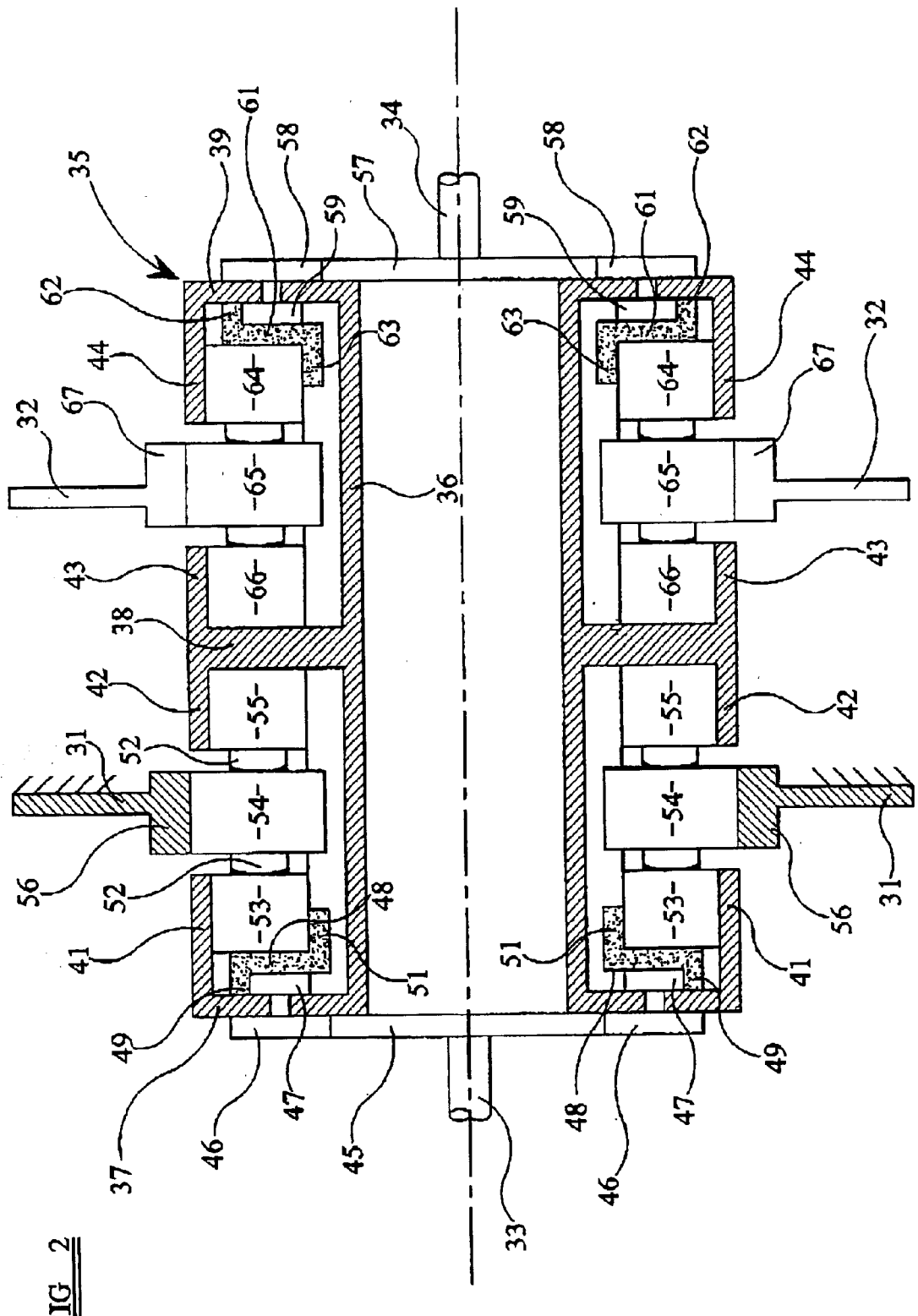
Figure 3:
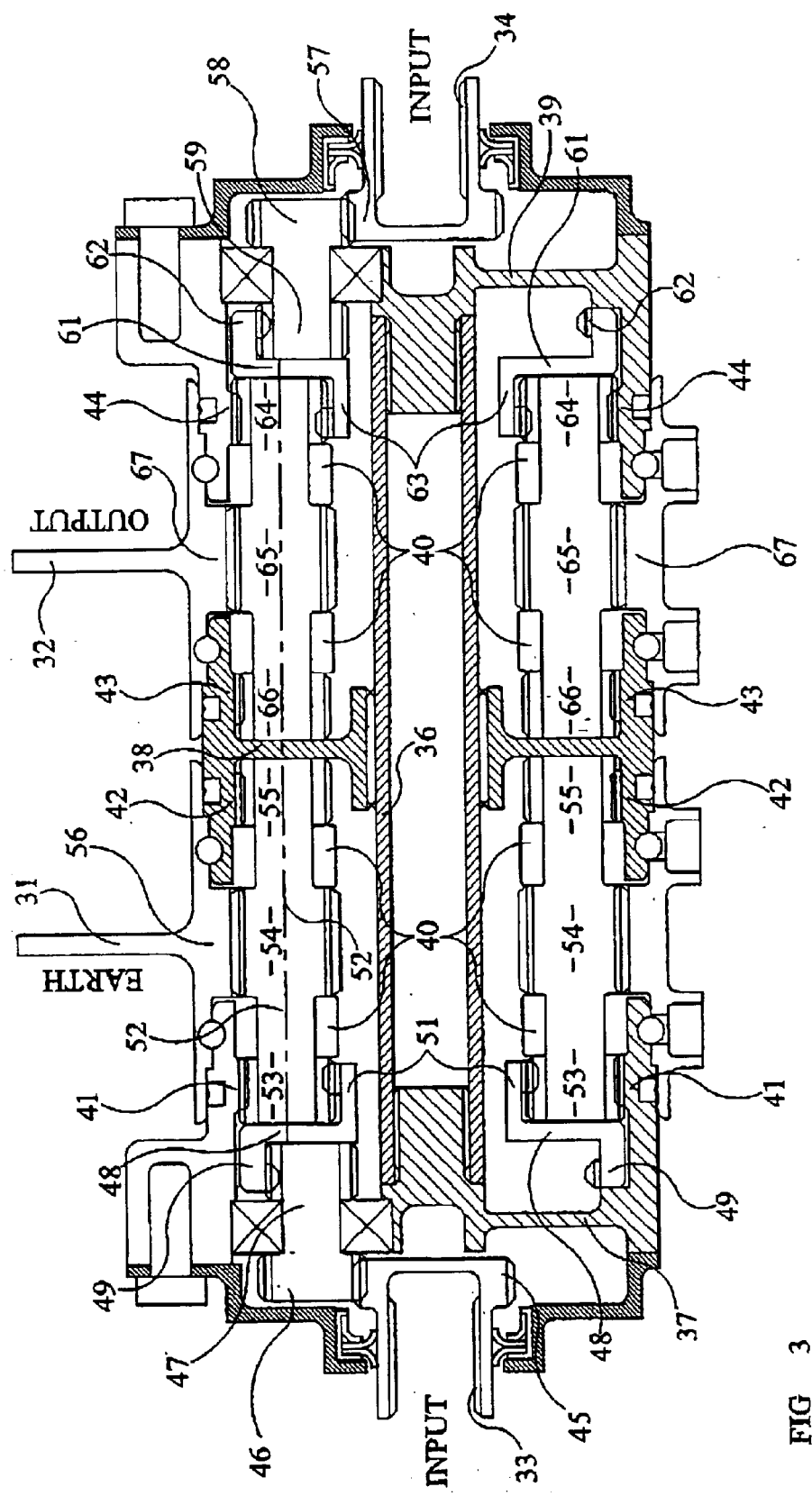

In the accompanying drawings,

FIG. 1 is a diagrammatic representation of a simple embodiment of the invention, FIG. 2 is a view similar to FIG. 1 of a more complex embodiment of the invention, FIG. 3 is a cross-sectional view of a practical embodiment of the actuator illustrated diagrammatically in FIG. 2, FIG. 4 is a view illustrating a pair of actuators of the kind shown in FIG. 3 sharing a common drive arrangement, and FIG. 5 is a view similar to FIG. 4 showing tie external profile of the arrangement.

Referring first to FIG. 1 of the drawings the actuator comprises an earth 11 in the form of a component which is fixed in use. For example if the actuator was controlling an aileron of an aircraft then the earth 11 would be fixed to the wing structure and a movable output member 12 of the actuator would be fixed to the movable control surface of the aileron structure. The actuator has a first rotary input 13 at one axial end thereof for connection to a respective source of rotary movement, for example an electric or hydraulic motor. At its opposite axial end the actuator has a second rotary input 14 for connection to a respective source of rotary movement, for example a second electrical hydraulic motor, the first and second inputs 13, 14 being coaxial.

The rotary input 13 includes a gear wheel 15 which is rotatable about the longitudinal axis of the actuator. The gear wheel 15 is disposed concentrically within an internally toothed ring gear 16 forming part of an end casing 16a of the earth 11 of the actuator. A plurality of planetary gears 17 are equiangularly spaced around the gear 15 and mesh simultaneously with the gear 15 and the ring gear 16. Each of the planetary gears 17 is mounted for rotation on a planetary gear carrier (not shown) the planetary gear carrier being mounted for rotation about the longitudinal axis of the actuator. Each of the planetary gears 17 is rotatably mounted to its carrier by way of a stub-shaft 17a which extends through the carrier and carries a second, larger diameter planetary gear wheel 18 at the face of the carrier opposite the gears 17.

A hollow sleeve 19 concentric with the axis of the actuator defines axially spaced second and third internal ring gears 21, 22 of differing diameter. The larger diameter ring gear 21 meshes with the planetary gear wheels 18 and the smaller diameter ring gear 22 meshes with a plurality of equiangularly spaced planetary gear wheels 23 carried by a second planetary gear carrier (not shown) through the intermediary of stub-shafts 23a which project through the carrier and at the opposite side of the carrier support larger diameter planetary gear wheels 24.

The gear wheels 23 additionally mesh with an input gear 25 equivalent to the input gear 15, but carried on the rotary input shaft 14. Lastly, a fourth internal ring gear 26 is formed as part of an end casing 26a of the output member 12 of the actuator and the ring gear 26 meshes with the gear wheels 24.

The mechanism illustrated in FIG. 1 can be considered to be an actuator consisting of two separately driven gear trains having the same fixed gear ratio between their input and an output, with the two outputs being summed to produce an output at the output member 12. Thus assuming that the inputs 13, 14 are rotated at equal speeds the planetary gears 17, and thus the planetary gears 18 will orbit within the fixed ring gear 16 thus driving the member 19 rotationally at a reduced speed. The ring gear 22 will thus drive the planetary gears 23 around the input gear 25, but as the input gear 25 is also rotating then the speed at which the planetary carrier of the gears 23, 24 rotates about the axis of the input 14 is increased. The rotation and orbital movement of the planetary gears 24 is transmitted to the ring gear 26 with which the gears 24 mesh, and thus the output member 12 of the actuator is moved relative to the earth 11 about the longitudinal axis of the actuator, but at a speed much reduced from the speed of the inputs 13, 14. The member 19 in effect sums the stepped-down drive of the inputs 13, 14 to drive the output member 12.

If we first consider a failure mode in which relative movement between the gears 23 and the ring gear 22 or between the gears 23 and the gear 25, is prevented then it will be recognised that the input 13 will drive the sleeve 19, the planetary carrier of the gears 23, 24, and the output member 12 en bloc and if necessary a mechanism may be provided to permit rotation of the input 14 relative to its prime mover. For example a shear connection could be provided which shears to disconnect the prime mover from the shaft 14 when the torque exceeds a predetermined value. It is to be recognised however that torque sensing means may be provided for de-energising the prime mover and rendering it free running so as to be driven with the input 14 if necessary in such circumstances. Alternatively the sensor could control an electro-magnetic clutch for disconnecting the input shaft from its prime mover. It will be understood that as the input 14 is not contributing to the speed of rotation of the planetary carrier of the gears 23, 24 then the output member 12 moves at half the speed which is achieved in normal operation when both gear trains are working and both input members 13, 14 are rotated at the same speed.

In the event of a failure in the drive path between the input member 13 and the sleeve 19 preventing relative rotation of the gears within that gear train then it will be understood that the sleeve 19 becomes stationary, in effect linked to the earth 11, and the output member 12 is driven solely by the input member 14 through the intermediary of the planetary gears 23 rotating within the ring gear 22 and the planetary gears 24 rotating within the ring gear 26.

As mentioned previously the gear ratio between the input 13 and the sleeve 19 is the same as the gear ratio between the input 14 and the ring gear 26 and thus again in the failure mode the output member 12 will be moved at half the speed which can be achieved in the normal operating mode. As mentioned previously disconnect means for example in the form of a shear connection can be provided in association with the rotary input 13 although a torque sensor may be employed to determine when the torque between the input 13 and its prime mover exceeds a predetermined value, and at that point to de-energise and render the prime mover free running so that the prime mover would be driven with the input 13. Alternatively the sensor could control an electromagnetic clutch to disconnect the input shaft from its prime mover.

Mention is made above of the possibility of using disconnect means to disconnect the input shafts 13, 14 from their respective prime movers in a gear train failure mode. FIG. 1 illustrates a prime mover 13a in the form of an hydraulic motor, driving the shaft 13, and the reference numeral 14a is used to denote an hydraulic motor constituting the prime mover of the shaft 14. The disconnect means transmitting drive from the prime mover 13a to the shaft 13 is indicated at 13b, and similarly the disconnect means transmitting drive from the prime mover 14a to the shaft 14 is indicated in FIG. 1 at 14b. The exact nature of the disconnect means 13b, 14b is not of particular importance to the invention, but preferably each of the disconnect means 13b, 14b will be a torque limiter generally of the form disclosed in our U.S. Pat. No. 5,630,490, the disclosure of which is imported herein by this reference. In such a torque limiter drive is transmitted from an input to an output through the intermediary of a connection including drive transmitting balls normally seated in recesses in opposing clutch plates to link the clutch plates to transmit drive. However, when the torque transmitted exceeds a predetermined value the balls are forced to ride out of the recess in one of the clutch plates and to drop into an escape pocket in the clutch plate so that the plates are no longer interconnected in a drive transmission by the ball or balls, and the plates can thus rotate relative to one another. It will be recognised that in such an operational mode, when incorporated into the arrangement of FIG. 1, the shaft 13 or the shaft 14 would be disconnected from its prime mover 13a or 14a.

Furthermore, the torque limiter described in U.S. Pat. No. 5,630,490 includes a braking arrangement which is rendered operative when the drive through the torque limiter is disconnected. Incorporation of such a torque limiter as the disconnect means 13b, 14b of FIG. 1 would result in disconnection of the shaft 13 from the prime mover 13a and simultaneous connection of the shaft 13 to the earth end casing 16a through the intermediary of a friction brake so that rotation of the shaft 13 relative to earth would be opposed by a friction braking action. Similarly, in the case of the disconnect means 14b, operation of the disconnect means would disconnect the drive transmission from the prime mover 14a to the shaft 14 and at the same time would connect the shaft 14 to the output end casing 26a through a friction brake so that the shaft 14 will be constrained to rotate with the output member 12.

The provision of the brake is of little significance while its respective gear train is in a jam mode, since as mentioned above when a jam occurs between gears 15 and 17 or between gear 17 and gear 16 the input shaft 13 is linked to the earth 11. Similarly, a jam in the gear train 22, 23, 25 results in the sleeve 19, the planetary carrier of the gears 23, 24, the gear wheel 25, the shaft 14, and the output gear 26 rotating en bloc. However, the braking action within the disconnect means 13b, 14b is extremely desirable to accommodate a situation in which a jam has occurred, resulting in disconnect of the drive between the prime mover and its respective input shaft, and that jam has then subsequently cleared. In such a situation the disconnect will not have been re-set, and so the prime mover will remain disconnected from its respective input shaft. Thus, in the absence of a brake arrangement, the input shaft 13 or 14 would be free to rotate as drive is transmitted from the opposite input shaft through the two gear trains of the actuator. Such a situation could result in the non-driven input shaft rotating freely, rather than the output member 12 being driven. Thus There could be a failure mode in which a drive shaft has been disconnected from its respective prime mover, and subsequently the jam has cleared, and thereafter the actuator fails to operate even though drive is being transmitted into the actuator from the non-disconnected prime mover. The provision of the braking arrangement within the disconnect means 13b, 14b, prevents such a failure to operate in the event of a jam clearing after a disconnect operation has taken place. For example, assuming that it is the gear train 15, 16, 17 which has jammed and has then subsequently been released following disconnection of the prime mover 13a from the shaft 13, then in the absence of the brake the shaft 13 could rotate freely as driven by the prime mover 14a, without the output member 12 being moved However, the brake in effect interconnects the shaft 13 and the earth 11 thereby simulating a continuation of the fault condition which gave rise to disconnection of the prime mover 13a from the shaft 13.

Similarly, where the jam has occurred in the gear train 22, 23, 25 and has subsequently cleared the shaft 14 would, in the absence of the brake arrangement, be free to rotate as driven by the prime mover 13a through the two gear trains, again with the possible result that the output member 12 will not be moved. However, the brake in the disconnect arrangement 14b links the shaft 14 with the output 12 (through the intermediary of the output end casing 264a thereby simulating a continuation of the jam condition and ensuring that the output 12 is driven by the prime mover 13a.

In the embodiment illustrated in FIG. 2 the earth of the actuator is indicated at 31 and the output member of the actuator is indicated at 32. The actuator has coaxial first and second inputs 33, 34 at opposite axial ends respectively of the actuator. Extending the full length of the actuator is a rotatable body 35 consisting of a first elongate cylindrical sleeve 36 coaxial with the inputs 33, 34 and having at its ends, and midway along its length, first second and third radially outwardly extending circular flanges 37, 38, 39 respectively. A first, short, axial sleeve integral with the flange 37 extends towards the flange 38 concentric with the sleeve 36 and is toothed internally to define a ring gear 41. Similar short flanges extend from the flange 38 in opposite directions and are toothed internally to define two further ring gears 42, 43. The flange 39 is also formed with a similar sleeve extending towards the flange 38 and internally toothed to define a fiber ring gear 44.

The input member 33 carries a gear wheel 45 rotatable therewith the gear wheel 45 meshing with a plurality of smaller gear wheels 46 journalled for rotation on the outer face of the flange 37 by means of stub-shafts which extend through the flange 37 and carry smaller diameter gear wheels 47 on the inner face of the flange 37. Each gear wheel 46 is linked to a respective gear wheel 47 so that the two rotate en bloc. A collar 48 is journalled for rotation around the sleeve 36 and is shaped at its radially outermost edge to define an internal ring gear 49 meshing with the gear wheels 47. The inner periphery of the collar 48 is shaped to define an external ring gear 51 concentric with and of smaller diameter than the ring gear 41.

A first planetary gear assembly is housed within the space defined between the sleeve 36 and the ring gears 41, 42 and comprises a pair of planetary gear carriers (not shown) rigidly secured to one another and rotatable about the axis of the actuator. The two planetary gear carriers carry a plurality of equiangularly spaced axially extending shafts 52 each of which is shaped to define three gear wheels 53, 54, 55 respectively. The gear wheels 53 mesh with the inner ring gear 41 and simultaneously with the outer ring gear 51 of the collar 48. The gear wheels 55 mesh with the ring gear 42, and the gear wheels 54 mesh with an internal ring gear 56 forming part of the earth 31 of the actuator.

The gearing arrangement at the opposite end of the actuator is substantially identical in that there is a gear wheel 57 rotatable with the input 34 meshing with gear wheels 58 journalled for rotation on the flange 39. The gear wheels 58 are drivingly connected with internal gear wheels 59 on the inner face of the flange 39 there being a rotatable collar 61 defining an internal ring gear 62 meshing with the gear wheels 59 and also defining an external ring gear 63 meshing with planetary gears 64 of a second planetary gear assembly which includes further gear wheels 65 and still further gear wheels 66 rigidly linked to the gear wheel 64 for rotation therewith about a common axis. The gear wheels 64 mesh with the ring gear 44 while the gear wheels 66 mesh with the ring gear 43. The gear wheels 65 mesh with an internal ring gear 67 forming part of the output member 32.

The gear wheels 55 and 66 together with the meshing ring gears 42 and 43 can be ignored when considering the drive transmission through the actuator and are provided to ensure that loads across the planetary gears are balanced and equally distributed, and therefore there is no tendency for the planetary gears to twist.

In operation, assuming firstly that there is no fault situation and the inputs 33 and 34 are rotated simultaneously at the same speed. Gear wheel 45 drives gear wheels 46 which in turn cause rotation of the collar 48 through the intermediary of the gear wheels 47 and the inner ring gear 49. The outer, smaller diameter ring gear 51 causes rotation of the gears 53, 54, 55 and since the ring gear 56 is locked (part of the earth 31) the whole of the first planetary gear assembly simultaneously rotates about the longitudinal axis of the actuator. The meshing of the gears 53 with the ring gear 41 ensures that the ring gear 41 and therefore the sleeve 36, the flanges 37, 38, 39, and the ring gears 41, 42, 43, 44 are rotated by the combined action of the rotation of the gears 53 about their axes and the orbiting movement of the gears 53 about the longitudinal axis of the actuator. Simultaneously drive is transmitted from the gear wheel 57 through the gear wheels 58 and 59 to the collar 61 to cause the gear wheels 64, 65, 66 to rotate about their common axis and at the same time for their carrier to orbit about the longitudinal axis of the actuator. The rotation and orbital movement of the gear wheel 65 is transmitted through the ring gear 67 to the output member 32 to move the output member 32 relative to earth 31. However, the speed of movement of the output member 32 is a speed determined by the combined inputs 45 and 57 as the movement of the ring gears 44 and 43 as part of the sleeve 36 sums the outputs of the two gear trains to produce the movement of the output member 32.

In the event that a jam occurs preventing relative rotation within the gear train driven by the input member 34 then that gear train moves en bloc with the sleeve 36 carrying with it the output member 32. The output member 32 moves at half the speed which it would achieve in a normal operation situation driven by both input members 33, 34. Similarly, if there is a failure within the gear train driven by the first input member 33 then the sleeve 36 and the ring gears 43, 44 are held stationary, and effectively become part of the earth 31. The output member 32 would then be driven solely by the input member 34 and again will move at a speed which is half of the speed which is achieved in the normal operating conditions when both drive members 33 and 34 contribute to the drive. As mentioned in relation to FIG. 1 means will be provided to ensure that if necessary the prime movers do not impede movements of the input members 33, 34 when a fault condition arises, and desirably disconnect means equivalent to 13b and 14b of FIG. 1 will be incorporated to provide a disconnect and brake action as described with reference to FIG. 1.

FIG. 3 is a cross-sectional view of a practical embodiment of the actuator illustrated in FIG. 2. The parts common to FIG. 2 carry the same reference numerals, and the operation is as described with reference to FIG. 2. FIG. 3 illustrates the planetary gear carriers as rigid metal rings 40 which support the planetary gears in mesh with their respective ring gears. The planetary gears can ride around the outer periphery of the rings 40 and the rings 40 can rotate about the actuator axis if necessary.

FIGS. 4 and 5 show the ganging of a pair of actuators of the kind shown in FIG. 3 so as to be axially aligned, and to be driven by the same pair of prime movers, the actuators being axially aligned. Each actuator includes a first drive transmission shaft 81 which extends completely through the respective sleeve 36 and which carries the input gear wheel 45 of each actuator. The drive arrangement at the opposite end of each actuator differs as will be described hereinafter. Each shaft 81 extends completely through its respective sleeve 36 and at its end remote from the respective gear wheel 45 is coupled to the shaft 81 of the next adjacent actuator by means of an axial coupling device 82. The input gear wheel 57 at the end of each actuator remote from the input gear wheel 45 is supported on a hollow sleeve through which the respective shaft 81 and coupling 82 extends. The gear wheel 45 and its respective hollow sleeve are journalled for rotation in a casing component 88 which forms a second earth element of the actuator and so is fixed in use. A series of axially aligned and interconnected offset shafts 89 lie alongside and parallel to the actuators and are supported by bearings on the earth components 31 and 88 of their respective actuator. Each shaft 89 carries a gear wheel 91 meshing within the respective gear wheel 57 of the adjacent actuator. Thus the first prime mover drives the axially aligned and interconnected shafts 81 while the second prime mover drives the axially aligned and interconnected shafts 89. The shafts 81 drive the input gear wheels 45 as described above, and the shafts 89 drive the input gear wheels 57 through the intermediary of the gear wheels 91.

In the event of a jam in one of the drive paths of one of the actuators that actuator will drive its output member at half speed and so that the control surface driven by the ganged actuators is not damaged it is important that all the ganged actuators operate at half speed. This will be the case as jamming of one gear train of one actuator will disconnect the chain of appropriate input shafts 81 or 89 from the respective prime mover so removing drive to the corresponding input of each actuator. As mentioned above a shear connection or torque sensor associated with each prime mover may effect disconnection or free running of the relevant prime mover in a fault situation by detecting the increase in torque in the drive pat which has a jam associated with it. However desirably a disconnect and brake arrangement generally as described with reference to FIG. 1 will be incorporated in the drive between the shaft 81 and its prime mover and between the shaft 89 and its prime mover to achieve the appropriate disconnect and braking of the shafts in a failure mode. The rearrangement of components necessary to apply the disconnect and brake arrangement to the construction of FIGS. 4 and 5 between the prime movers and the input end of the chains of input shafts 81, 89 is within the competence of the skilled man.

It will be recognised that in all of the embodiments described above the intended actuation speed of the output member of the actuator is achieved only when both drive paths (gear trains) from the separate inputs are operative. In a fault situation the output member is driven at half speed and so provides a clear indication of a failure. Moreover each gear train always transmits no more than half the normal operating drive power and so can be constructed and serviced with this in mind rather tan having to assume that each drive path will transmit fill drive power as in certain of the prior art.

In relation to all of the examples described above it is the case that two gear trains have the same gear ratio. Equality of gear ratios in the two trains is preferable but not essential. Where the gear trains have different ratios the speed of the output member will be determined, in a failure mode, by the gear train which remains operative and the output speed in a failure mode could thus be indicative of which of the two gear trains has failed.

We claim:
1. A geared rotary actuator comprising a first rotary input member driven by a respective first source of rotary movement, a second rotary input member driven by a respective second source of rotary movement, first and second reduction gear trains, a ground for fixing the actuator in use, and an output member moveable relative to said ground for connection to a component to be moved by the actuator, said first and second reduction gear trains driven by said first and second rotary input members respectively and each of said first and second reduction gear trains including a respective output, and, the actuator further including output summing means interconnecting said outputs of said first and second gear reduction trains with said output member of the actuator whereby movement of said output member relative to said ground in response to rotation of said gear train input members is the sum of the movements of said gear train outputs.

2. A geared rotary actuator as claimed in claim 1, wherein said gear trains have fixed, equal, step-down gear ratios between their input and output.

3. An actuator system including a geared rotary actuator comprising first and second reduction gear trains, a ground for fixing the actuator in use, and an output member movable relative to said ground for connection to a component to be moved by the actuator, said first and second reduction gear trains each including a respective rotary input member and a respective output, said first and second gear train input members being arranged in use to be driven by respective sources of rotary movement, and, the actuator further including output summing means interconnecting said outputs of said first and second gear reduction trains with said output member of the actuator whereby movement of said output member relative to said ground in response to rotation of said gear train input members is the sum of the movements of said gear train outputs, and, the actuator system further including torque sensitive means for determining when the torque at the first and second gear train input members exceeds a predetermined value and for deactivating the application of torque to that one of said first and second gear train input members whose torque has exceeded said predetermined value.

4. An actuator system as claimed in claim 3, wherein said torque sensitive means deactivates the application of torque to that one of said first and second gear train input members whose torque has exceeded said value by disconnecting the relevant input member from its source of rotary movement.

5. An actuator system as claimed in claim 4, wherein said torque sensitive means also effects the application of a braking load to that input member which has been disconnected from its source of rotary movement.

6. An actuator system as claimed in claim 3, wherein said torque sensitive means for deactivating the application of torque to that one of said first and second gear train input members whose torque has exceeded said value, serves to render the source of rotary movement of the relevant input member free running.

7. An actuator system as claimed in claim 3, further including a second geared rotary actuator comprising first and second reduction gear trains, a ground for fixing the actuator in use, and an output member movable relative to said ground for connection to a component to be moved by the actuator, said first and second gear reduction trains each including a respective rotary input member and a respective output, said first and second gear train input members being arranged in use to be driven by respective sources of rotary movement, and, the actuator further including output summing means interconnecting said outputs of said first and second gear reduction trains with said output member of the actuator whereby movement of said output member relative to said ground in response to rotation of said gear train input members is the sum of the movements of said gear train outputs, said first source of rotary movement of said first actuator and said first source of rotary movement of said second actuator being a common first source of rotary movement, and said second source of rotary movement of said first actuator and said second source of rotary movement of said second actuator being a common second source of rotary movement.

8. An actuator system as claimed in claim 5, further including a second geared rotary actuator comprising first and second reduction gear trains, a ground for fixing the actuator in use, and an output member movable relative to said ground for connection to a component to be moved by the actuator, said first and second gear reduction trains each including a respective rotary input member and a respective output, said first and second gear train input members being arranged in use to be driven by respective sources of rotary movement, and, the actuator further including output summing means interconnecting said outputs of said first and second gear reduction trains with said output member of the actuator whereby movement of said output member relative to said ground in response to rotation of said gear train input members is the sum of the movements of said gear train outputs, said first source of rotary movement of said first actuator and said first source of rotary movement of said second actuator being a common first source of rotary movement, and said second source of rotary movement of said first actuator and said second source of rotary movement of said second actuator being a common second source of rotary movement.

9. An actuator system including first and second geared rotary actuators each as claimed in claim 1, the first gear train input members of the first and second actuators being driven from a common first source of rotary movement and the second gear train input members of the first and second actuators being driven from a common second source of rotary movement.

10. An actuator system as claimed in claim 7, wherein said first and second rotary geared actuators are aligned with their longitudinal axes coextensive.

11. An actuator system as claimed in claim 7, wherein said first gear train input members are driven from said common first source of rotary movement by means including a shaft which extends coaxially through said first geared rotary actuator.

12. An actuator system as claimed in claim 7, wherein said second gear train input members are driven from said common second source of rotary movement by means including a shaft which extends externally of the gear trains of said first geared rotary actuator, parallel to the longitudinal axis of the first geared rotary actuator.

13. An actuator system as claimed in claim 8, wherein said first and second rotary geared actuators are aligned with their longitudinal axes coextensive, said first gear train input members are driven from said common first source of rotary movement by means including a shaft which extends coaxially through said first geared rotary actuator, and said second gear train input members are driven from said common second source of rotary movement by means including a shaft which extends externally of the gear trains of said first geared rotary actuator, parallel to the longitudinal axis of the first geared rotary actuator.

14. An actuator system as claimed in claim 9, wherein said first and second rotary geared actuators are aligned with their longitudinal axes coextensive.

15. An actuator system as claimed in claim 9, wherein said first gear train input members are driven from said common first source of rotary movement by means including a shaft which extends coaxially through said first geared rotary actuator.

16. An actuator system as claimed in claim 9, wherein said second gear train input members are driven from said common second source of rotary movement by means including a shaft which extends externally of the gear trains of said first geared rotary actuator, parallel to the longitudinal axis of the first geared rotary actuator.

* * * * *